Oct. 13, 1953    S. J. HOLLINGSWORTH    2,654,972
FISHING LINE SIGNAL LIGHT
Filed June 6, 1951
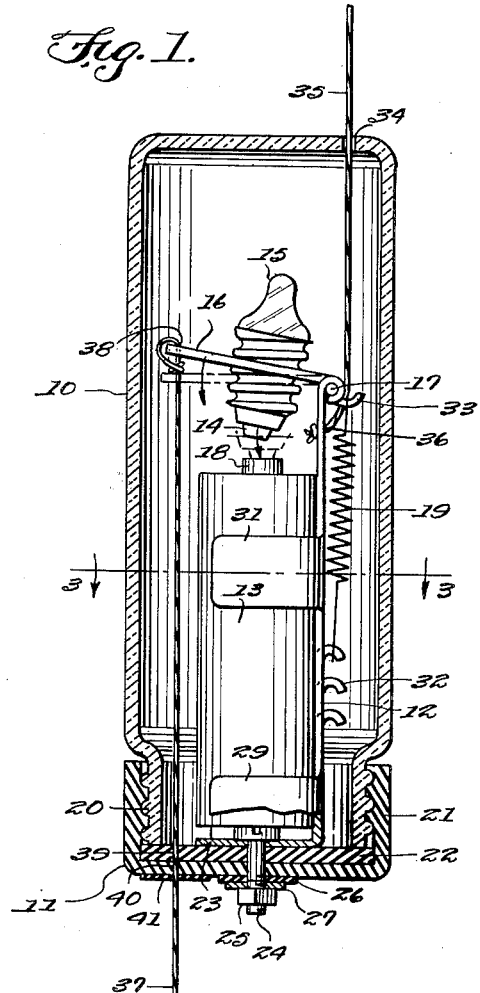
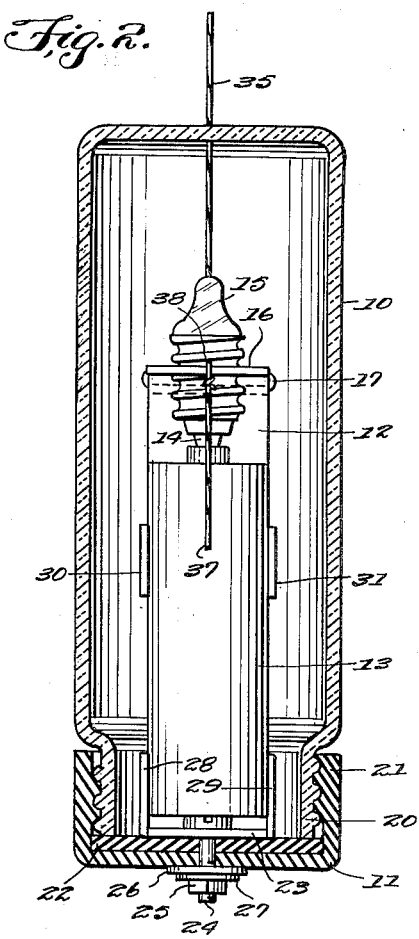
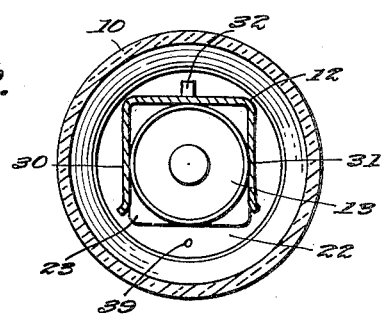
INVENTOR.
Stanley J. Hollingsworth,
BY Victor J. Evans & Co.
ATTORNEYS Patented Oct. 13, 1953

2,654,972

UNITED STATES PATENT OFFICE 2,654,972

FISHING LINE SIGNAL LIGHT

Stanley J. Hollingsworth, Jenks, Okla.

Application June 6, 1951, Serial No. 230,167

2 Claims. (Cl. 43—17)

This invention relates to signal devices used in fishing lines for indicating when a fish is caught on a hook of the line, and in particular a light in combination with a battery in a transparent container whereby the pull of a fish on the line lights a light in the container.

The purpose of this invention is to provide a visible signal device which is operated by the pull of a fish on a fishing line which lights a light when a fish is caught on the line.

Various devices have been provided as improvements on the conventional cork to indicate the pull of a fish on a fishing line, however, particularly in dimly lighted sections and at night it is difficult to see the action of a conventional cork.

With this thought in mind this invention contemplates a light incorporated in a floating transparent container whereby the pull of a fish on the line closes a circuit that lights the light so that the presence of a fish on the line is positively indicated.

The object of this invention is, therefore, to provide an improved type of fishing line bob or cork in which a light incorporated in the device is lighted to indicate the pull of a fish on the line.

Another object of the invention is to provide a circuit closing device for providing a light when a fish pulls on a fishing line in which means is provided for opening the circuit if the fish escapes from the hook.

A further object of the invention is to provide a floating device having a light therein adapted to be incorporated in fishing lines so that the light is lighted with the pull of a fish on the line, which is of a simple and economical construction.

With these and other objects and advantages in view the invention embodies a transparent container having a sealing cap with a light carried by an arm pivotally mounted in combination with a battery in the container whereby with a fishing line attached to the arm the pull of a fish thereon moves a contact of the light in engagement with the terminal of the battery whereby a circuit is completed to the light. The device also includes a spring for separating the contact of the light from the terminal of the battery when force on the fishing line is relieved.

Other features and advantages of the invention will appear from the following description taken in connection with the drawings wherein:

Figure 1 is a vertical section through the transparent container with a light, battery and mounting elements shown in elevation in the container.

Figure 2 is a similar view taken from a point at a right angle to that shown in Figure 1 and showing the light with the terminal thereof in engagement with the terminal of the battery.

Figure 3 is a cross section through the device taken on line 3—3 of Figure 1.

Referring now to the drawings wherein like reference characters denote corresponding parts the improved fishing line light signal of this invention includes a transparent container 10 having a sealing cap 11 with a bracket 12 mounted on the cap and positioned in the container and with a battery 13 frictionally held in the bracket and positioned to be engaged by a contact 14 with a light bulb 15 which is carried in an arm 16 pivotally mounted on the upper end of the bracket by a pin 17 and resiliently held in the position shown in Figure 1 wherein the contact 14 is spaced from a terminal 18 of the battery by a spring 19.

In the design shown the container 10 is provided with a threaded neck 20 and the cap 11 is provided with an internally threaded flange 21 by which the cap is threaded on the neck of the container. A sealing gasket 22 is positioned against the inner surface of the cap and a flange 23 on the lower end of the bracket 12 is secured to the cap by a bolt 24, the outer end of which is provided with a nut 25 under which a rubber washer 26 and also a metal washer 27 are positioned.

The bracket 12 is provided with spring actuated or resilient gripping arms 28 and 29, at the lower end and 30 and 31, on the upper part thereof, the arms being positioned to frictionally engage the surface of the battery 13 to hold the battery in position.

The bracket 12 is also provided with a plurality of spaced hooks 32 over which the lower end of the spring 19 is hooked with the upper end of the spring extended over a hook 33, extended from the arm 16 and the arm is resiliently held in the upwardly extended position shown in full lines in Figure 1 by the spring. The spring may be placed over the second or third hook to increase the tension thereof and it will be understood that as many hooks may be provided as may be desired.

The container 10 is provided with an opening 34 in the upper end through which a section 35 of a fishing line extends, the end of the line being connected to the bracket 12 through an opening positioned at the point 36.

The hook section 37 of the fishing line is connected to the extended end of the arm 16, at the point 38 and from this point the line 37 extends through an opening 39 in the gasket 22 and also through an opening 40 in the cap 11, the opening 40 being sealed by a washer 41 that may be formed of rubber or other suitable material. The section 37 of the fishing line is provided with a sinker 42 that may be located any suitable distance from the container 10 and a leader 43 extends from the lower end of the sinker.

With the parts arranged in this manner a pull on the leader 43 draws the arm 16 downwardly whereby the contact 14 engages the terminal 18 of the battery and with the opposite terminal of the battery and also the opposite terminal of the light grounded with the bracket 12 a circuit is completed to the light 15 so that a light shows in the container.

Upon release of the hook by a fish the spring 19 draws the arm 16 upwardly to the position shown in full lines in Figure 1 whereby the circuit is broken to the light.

It will be understood that modifications may be made in the design and arrangement of the parts without departing from the spirit of the invention.

What is claimed is:

1. In a fishing line signal light, the combination which comprises a floating transparent container, a sealing cap mounted on the said container, a bracket having friction gripping arms extended therefrom mounted in the container, a battery held in the arms of the bracket, an arm pivotally mounted on the bracket, a light positioned in the arm pivotally mounted on the bracket and located so that a contact thereof is positioned to engage a terminal of the battery, a spring attached to the bracket and arm in which the light is carried for holding the arm in such a position that the contact of the light is spaced from the terminal of the battery, a line extended from the arm in which the light is carried through an opening in the container, and a second line extended from the bracket in the container through an opening in the upper end of the container and adapted to be connected to a fishing pole or the like.

2. In a fishing line signal light, the combination which comprises a vertically disposed tubular transparent container having a threaded neck on the lower end thereof, a cap threaded on the lower end of the container, a gasket positioned between the cap and end of the neck of the container for sealing the lower end of the container, a bracket mounted on the cap and positioned in the container, a battery having a terminal on the upper end positioned in the bracket, an arm pivotally mounted on the bracket and extended from the upper part thereof, a light carried by the arm and having its terminal positioned to engage the terminal at the upper end of the battery, a fishing line attached to the extended end of said arm and extended through the cap on the lower end of the container, a second fishing line attached to the bracket and extended through an opening in the upper end of the container, and a spring mounted at one end on the bracket and attached at its other end to said arm for resiliently urging the arm with the light carried thereby upwardly to separate the terminal of the light from the terminal of the battery.

STANLEY J. HOLLINGSWORTH.

References Cited in the file of this patent

UNITED STATES PATENTS

| Number | Name | Date |
|---|---|---|
| 2,104,888 | Spahr | Jan. 11, 1938 |
| 2,179,878 | Dietrich | Nov. 14, 1939 |
| 2,331,665 | Douglas et al. | Oct. 12, 1943 |
| 2,530,050 | Evans | Nov. 14, 1950 |

FOREIGN PATENTS

| Number | Country | Date |
|---|---|---|
| 231,446 | Switzerland | June 16, 1944 |